(12) United States Patent
Hussain

(10) Patent No.: US 7,761,325 B2
(45) Date of Patent: Jul. 20, 2010

(54) INTELLIGENT INVENTORY APPLICATIONS AND SERVICES

(75) Inventor: Altaf Hussain, Alpharetta, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 285 days.

(21) Appl. No.: 11/588,549

(22) Filed: Oct. 27, 2006

(65) Prior Publication Data

US 2008/0103914 A1    May 1, 2008

(51) Int. Cl.
*G06F 30/00* (2006.01)
*G07G 1/14* (2006.01)

(52) U.S. Cl. ........................................... 705/14
(58) Field of Classification Search .................. 705/28, 705/26
See application file for complete search history.

(56) References Cited

U.S. PATENT DOCUMENTS

| | | | |
|---|---|---|---|
| 6,204,763 | B1 | 3/2001 | Sone |
| 6,430,541 | B1 | 8/2002 | Brown et al. |
| 6,988,080 | B2 | 1/2006 | Zack et al. |
| 7,065,501 | B1 | 6/2006 | Brown et al. |
| 7,341,186 | B2 * | 3/2008 | Mrozik et al. ............... 235/384 |
| 7,363,249 | B1 * | 4/2008 | Boesjes ...................... 705/26 |
| 2001/0051905 | A1 * | 12/2001 | Lucas ........................ 705/28 |
| 2002/0049652 | A1 | 4/2002 | Moore et al. |
| 2003/0036981 | A1 * | 2/2003 | Vaughan et al. ............. 705/28 |
| 2003/0204451 | A1 * | 10/2003 | Chu et al. ................... 705/28 |
| 2003/0208417 | A1 * | 11/2003 | Heinrichs et al. ........... 705/28 |
| 2003/0214387 | A1 | 11/2003 | Giaccherini |
| 2005/0091164 | A1 * | 4/2005 | Varble ....................... 705/52 |
| 2006/0157564 | A1 | 7/2006 | Schulte |
| 2006/0190273 | A1 | 8/2006 | Wilbrink et al. |
| 2006/0190363 | A1 | 8/2006 | Brown et al. |

FOREIGN PATENT DOCUMENTS

JP          2004178175 A    *   6/2004

* cited by examiner

*Primary Examiner*—Matthew S Gart
*Assistant Examiner*—R. Shay Glass
(74) *Attorney, Agent, or Firm*—Scott P. Zimmerman, PLLC

(57) ABSTRACT

Methods, systems, and products are disclosed for intelligent inventory applications and services. A purchase request to purchase a product is received that has a product number to be purchased, an account number to process for payment, and a purchaser's inventory information that identifies the purchaser's inventory database to update with the product number. The account number is communicated for payment authorization. When payment is authorized, the product number is communicated to the purchaser's inventory database to reflect the purchase of the product.

18 Claims, 11 Drawing Sheets

INTELLIGENT INVENTORY APPLICATIONS AND SERVICES

CROSS-REFERENCE TO RELATED APPLICATIONS

This application relates to the commonly-assigned and concurrently filed U.S. application Ser. No. 11/588,797, entitled "Methods, Systems, and Products for Managing Inventory," and incorporated herein by reference in its entirety.

COPYRIGHT NOTIFICATION

A portion of the disclosure of this patent document and its attachments contain material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

BACKGROUND

The exemplary embodiments generally relate to data processing and, more particularly, to inventory monitoring and management.

Inventory monitoring and management needs improvement. Conventional inventory systems track the quantity of an item and, when that item needs replenishment, issue orders for that item. These conventional inventory systems, however, are not oriented as a service to customers. That is, conventional inventory systems fail to automatically update the inventory when goods and services are purchased or otherwise acquired. The conventional inventory systems require that a user manually add purchased items to the inventory. In time, however, the user's enthusiasm wanes, and the user inevitably looses interest in maintaining an accurate inventory of property and possessions. Moreover, even if the conventional inventory systems do have features for automatically updating the inventory, those updates are provided by the user's organization (e.g., a purchasing department). What is needed, though, are methods, systems, and products for managing inventory that automatically provide updates on behalf of the user or customer.

SUMMARY

The exemplary embodiments provide methods, systems, and products for managing inventory. These exemplary embodiments describe intelligent inventory applications that organize and inventory a user's property and possessions. These intelligent inventory applications, however, do not require the user to manually enter items into the inventory. The exemplary embodiments of the present invention, instead, permit merchants, medical providers, and other third parties to update the inventory on behalf of the user. That is, when a user of this invention purchases a good or service, exemplary embodiments allow the seller-merchant, physician, or third party to update the purchaser's inventory. As the user makes purchases, the merchants send electronic message notifications of those purchases to the purchasing user's inventory service. The user is thus relieved from the laborious and tedious tasks of maintaining their inventory. The present invention may also allow a financial institution to update the purchasing user's inventory. When, for example, the user makes purchases using a credit card, a financial institution may not only process the credit transaction, but the financial institution may also send an electronic message notification to the purchasing user's inventory service. The present invention thus provides an inventory service in which the inventory is automatically updated on behalf of a customer.

Exemplary embodiments describe an inventory service. This inventory service is available to businesses and to residential consumers. Whenever the business or consumer makes a purchase, this inventory service automatically updates the purchaser's inventory database. The merchant who makes the sale, for example, sends an electronic message notification to the purchasing user's inventory service. A financial institution may also send an electronic message notification to the purchasing user's inventory service. Either way, the purchaser's inventory database is updated on behalf of the purchaser to reflect the purchase. These mechanisms for automatically updating the purchaser's inventory thus relieve the purchaser of painstakingly entering the purchase.

Exemplary embodiments include a method for managing inventory. A purchase request is received to purchase a product. The purchase request comprises a product number, an account number, and a purchaser's inventory information. The product number uniquely identifies the product to be purchased. The account number identifies an account to be processed for payment. The inventory information identifies the purchaser's inventory database to update with the product number. The account number is communicated for payment authorization. When payment is authorized, the product number is communicated according to the purchaser's inventory information. The purchaser's inventory database is thus updated to reflect the purchase of the product.

More exemplary embodiments include a system for managing inventory. A merchant inventory application is stored in memory, and a processor communicates with the memory and executes the merchant inventory application. The merchant inventory application instructs the processor to process a purchase request to purchase a product. The purchase request comprises a product number, an account number, and a purchaser's inventory information. The product number uniquely identifies the product to be purchased. The account number identifies an account to be processed for payment. The inventory information identifies the purchaser's inventory database that is to be updated with the product number. The processor communicates the account number for payment authorization. When payment is authorized, the processor communicates the product number according to the purchaser's inventory information to update the purchaser's inventory database. The processor thus updates the purchaser's inventory database to reflect the purchaser's purchase of the product.

Other exemplary embodiments describe a computer program product for managing inventory. A purchase request is received to purchase a product. The purchase request comprises a product number, an account number, and a purchaser's inventory information. The product number uniquely identifies the product to be purchased. The account number identifies an account to be processed for payment. The inventory information identifies the purchaser's inventory database to update with the product number. The account number is communicated for payment authorization. When payment is authorized, the product number is communicated according to the purchaser's inventory information. The purchaser's inventory database is thus updated to reflect the purchase of the product.

Other systems, methods, and/or computer program products according to the exemplary embodiments will be or become apparent to one with ordinary skill in the art upon review of the following drawings and detailed description. It is intended that all such additional systems, methods, and/or computer program products be included within this description, be within the scope of the claims, and be protected by the accompanying claims.

BRIEF DESCRIPTION OF THE SEVERAL VIEWS OF THE DRAWINGS

These and other features, aspects, and advantages of the exemplary embodiments are better understood when the following Detailed Description is read with reference to the accompanying drawings, wherein.

DETAILED DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Those of ordinary skill in the art further understand that the exemplary hardware, software, processes, methods, and/or operating systems described herein are for illustrative purposes and, thus, are not intended to be limited to any particular named manufacturer.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

Figure 1:
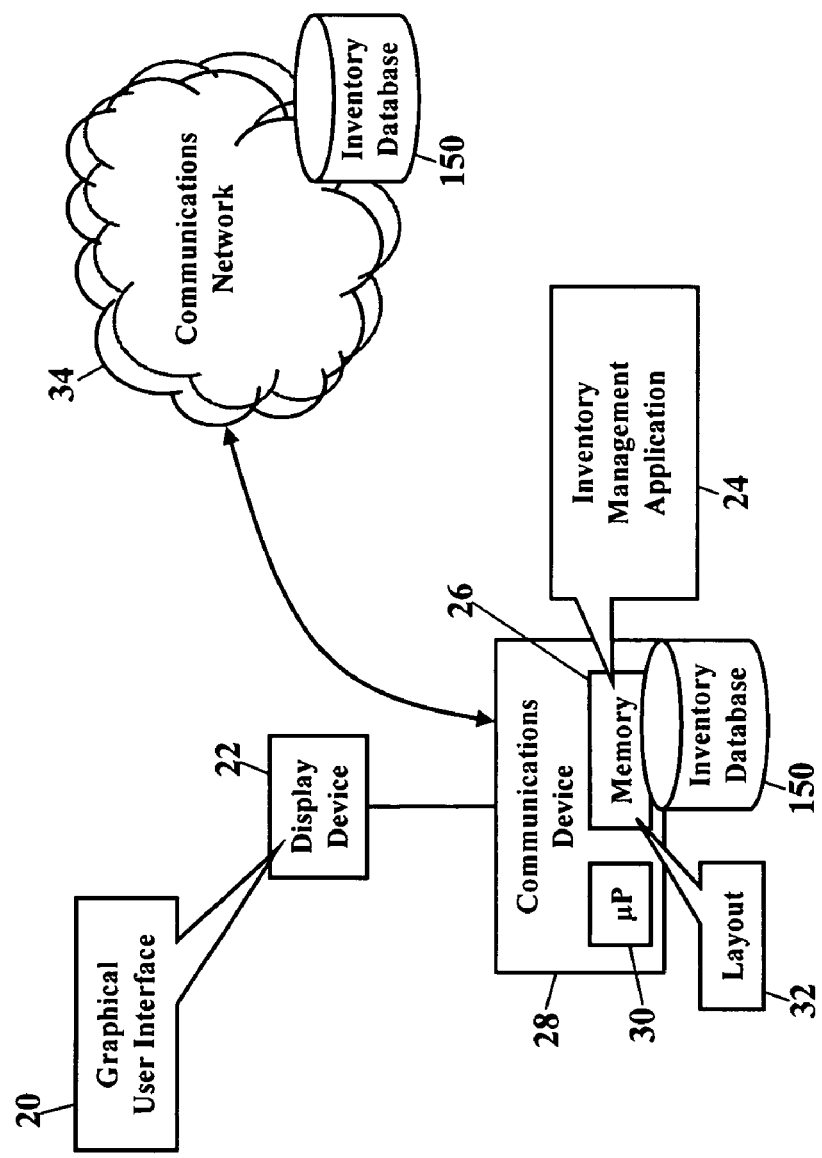
FIG. 1 is a schematic illustrating a network environment in which exemplary embodiments may be implemented.

FIG. 1 is a schematic illustrating an environment in which exemplary embodiments may be implemented. A graphical user interface 20 is visually presented on a display device 22 by an inventory management application 24. According to exemplary embodiments, the inventory management application 24 is a set of processor-executable instructions that create and maintain an inventory of articles for a business or residence (hereinafter the "user" or "customer"). The inventory management application 24 is stored in memory 26 of a communications device 28, and a processor 30 executes the inventory management application 24. The inventory management application 24 is a software engine that tracks an inventory of the user's property and possessions. Anything the user purchases, owns, and/or possesses, such as vehicles, supplies, chattel, furniture, jewelry, and food, may be logged and tracked by the inventory management application 24. Because the inventory management application 24 tracks and maintains a complete inventory of the user's personal property, real property, and/or possessions, the inventory management application 24 may store that inventory information in an inventory database 150. Anything the user purchases, owns, and/or possesses may be stored in the inventory database 150. The inventory management application 24 may even access a building layout 32, thus allowing an inventory of the user's articles on a room-by-room basis. The inventory management application 24 may also communicate with other communications devices via a communications network 34.

The following paragraphs, however, will not fully explain all the features and capabilities of the inventory management application 24. Those features and capabilities are more fully described in the commonly-assigned and concurrently filed U.S. application Ser. No. 11/588,787, entitled "Methods, Systems, and Products for Managing Inventory," and incorporated herein by reference in its entirety.

Figure 2:
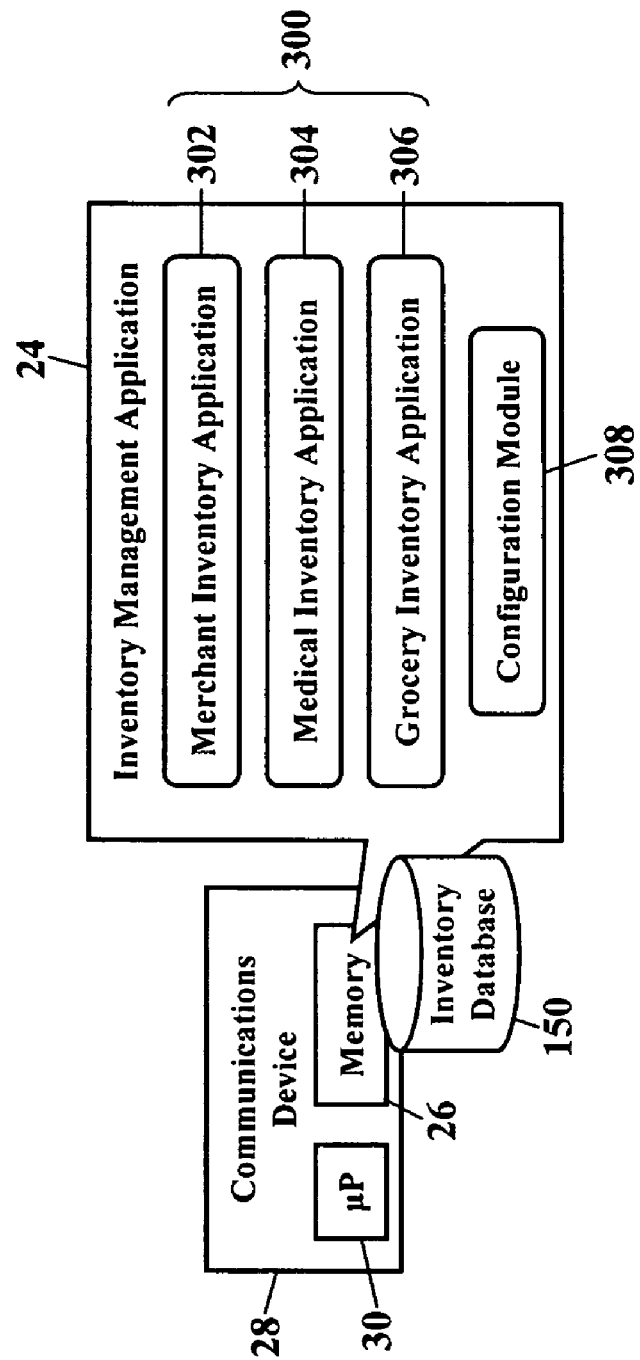
FIG. 2 is a schematic illustrating software modules that enhance inventory management, according to more exemplary embodiments.

FIG. 2 is a schematic illustrating software modules that enhance the inventory management application 24, according to more exemplary embodiments. The inventory management application 24, for example, may interface with various inventory applications 300. According to exemplary embodiments, these inventory applications 300 are software engines that provide specific inventory management solutions for various services. Each inventory application 300 may be locally stored in the memory 26, or any of the inventory applications 300 may be remotely accessible via the communications network (shown as reference numeral 34 in FIG. 1).

Each inventory application 300 is tailored to provide an inventory service and to update the inventory database 150. Some examples of these inventory applications 300 may include merchant services, medical services, and food services. As the user makes purchases from merchants, for example, a merchant inventory application 302 processes those purchases and automatically updates the inventory database 150. That is, whatever product or service the merchant sells, the seller-merchant updates the purchaser's inventory database 150. The user is thus relieved from manually entering her/his purchased products into the inventory database 150. The merchant inventory application 302 may even track sales made by users to merchants. A medical inventory application 304 tracks the user's inventory of medical supplies, such as prescription medicines. When the inventory database 150 indicates that prescription or non-prescription medicine is low or depleted, the medical inventory application 304 may interface with an insurer, pharmacy, or physician to obtain a refill. Similarly, a grocery inventory application 306 tracks the user's inventory of perishable and non-perishable food supplies and automatically replenishes when supplies are low or depleted. Later paragraphs will more fully describe the services and capabilities offered by the inventory applications 300.

FIG. 2 also illustrates a configuration module 308. The configuration module 308 allows the user of the inventory management application 24 to establish what persons have permission(s) to access the inventory database 150. The configuration module 308 even allows the user to configure individual inventoried items in the inventory database 150. The user, for example, may associate an inventoried room with one or more people. When the articles in that room are inventoried, each person associated with that room may uniquely configure that inventoried space. A person's bedroom items, for example may be configured as "private" in order to limit what inventoried articles are accessible to other users. A user, in other words, may "hide" articles in the inventory database 150, thus preventing other people from accessing inventoried items or inventoried rooms. When articles are configured or tagged as "public," the user may permit public access to those inventoried items. The user may even establish permissions and access for "semi-private" or "semi-public" items in the inventory database 150. Later paragraphs will more fully describe services and capabilities offered by the configuration module 308.

Some aspects of inventory management are known, so this disclosure will not greatly explain the known details. If the reader desires more details, the reader is invited to consult the following sources, all incorporated herein by reference in their entirety: U.S. Pat. No. 6,204,763 to Sone (Mar. 20, 2001); U.S. Pat. No. 6,430,541 to Brown et al. (Aug. 6, 2002); U.S. Pat. No. 6,988,080 to Zack et al. (Jan. 17, 2006); U.S. Pat. No. 7,065,501 to Brown et al. (Jun. 20, 2006); Published U.S. Patent Application 2002/0049652 to Moore et al. (Apr. 25, 2002); Published U.S. Patent Application 2003/0214387 to Giaccherini (Nov. 20, 2003); Published U.S. Patent Application 2006/0157564 to Schulte (Jul. 20, 2006); Published U.S. Patent Application 2006/0190273 to Wilbrink et al. (Aug. 24, 2006); and Published U.S. Patent Application 2006/0190363 to Brown et al. (Aug. 24, 2006).

Figure 3:
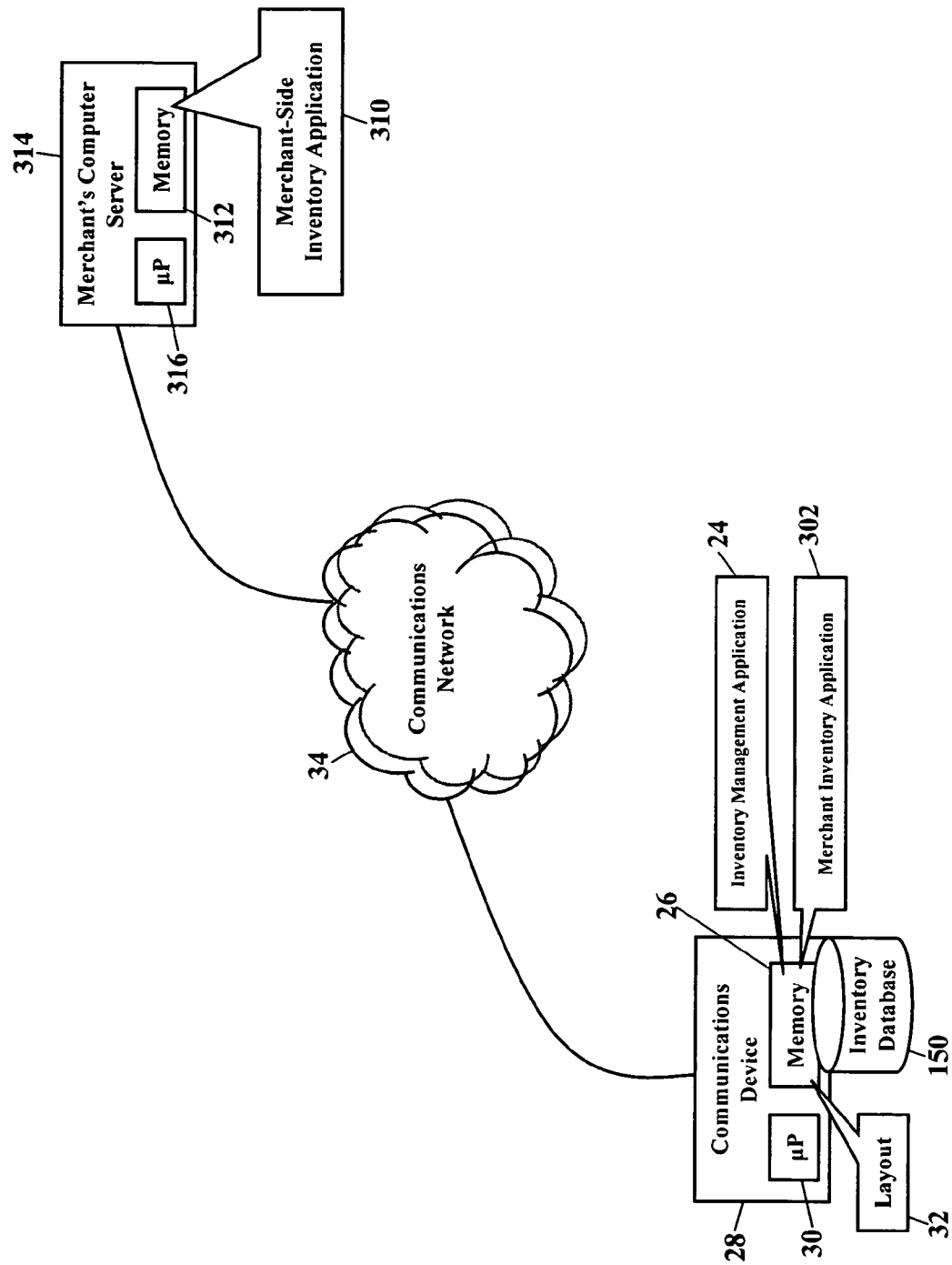
FIG. 3 is a schematic illustrating a merchant inventory application, according to more exemplary embodiments.

FIG. 3 is a schematic further illustrating the merchant inventory application 302, according to more exemplary embodiments. According to exemplary embodiments, the merchant inventory application 302 is a software module that receives notifications when purchases are made. The merchant inventory application 302 then automatically updates the purchaser's inventory database 150, thus relieving the purchaser from manually entering her/his purchased product or service into the inventory database 150.

As FIG. 3 illustrates, the merchant inventory application 302 interfaces with a companion merchant-side inventory application 310. According to exemplary embodiments, the merchant-side inventory application 310 is a computer program or engine that is stored in memory 312 of a merchant's computer server 314. A merchant-side processor 316 communicates with the memory 312 and executes the merchant-side inventory application 310. When a purchaser desires to purchase a product or service from the merchant, the merchant-side inventory application 310 informs the merchant inventory application 302 of that purchase. The merchant inventory application 302 and the companion merchant-side inventory application 310 thus cooperate to automatically update the purchaser's inventory database 150. Here, then, the merchant not only sells a product or service to the purchasing user, but the merchant (via the merchant's computer server 314) also provides an inventory service to the purchaser. The merchant's computer server 314 thus automatically informs the purchasing user's communications device 28 of that purchase. The merchant inventory application 302 then interfaces with the inventory management application 24. The inventory management application 24 is thus able to update the inventory database 150 to reflect the purchased product or service. The purchasing user is thus relieved from manually entering the purchase into the inventory database 150.

Figure 4:
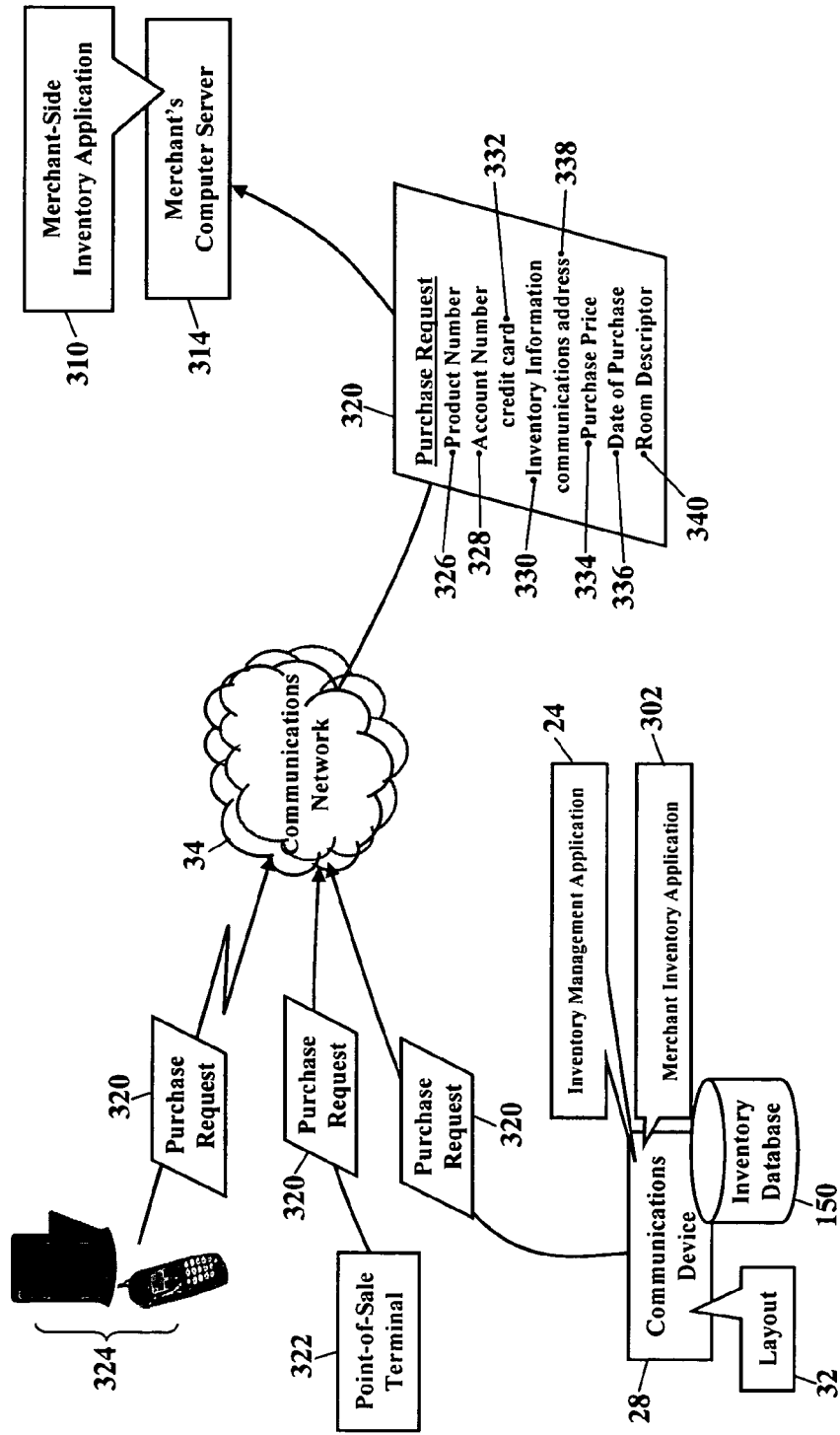
FIGS. 4-6 are schematics illustrating automatic inventory updates, according to yet more exemplary embodiments.
Figure 5:
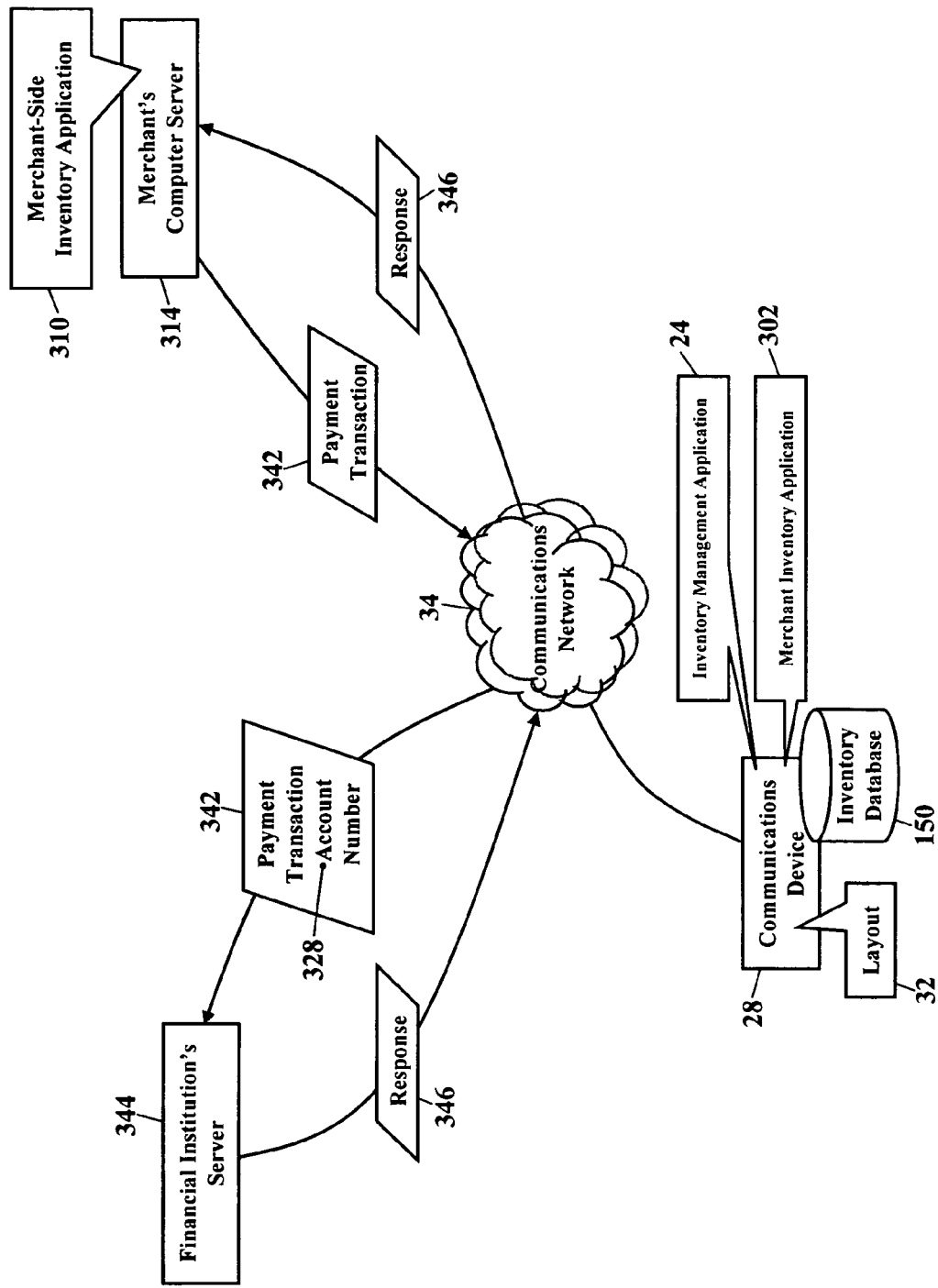
Figure 6:
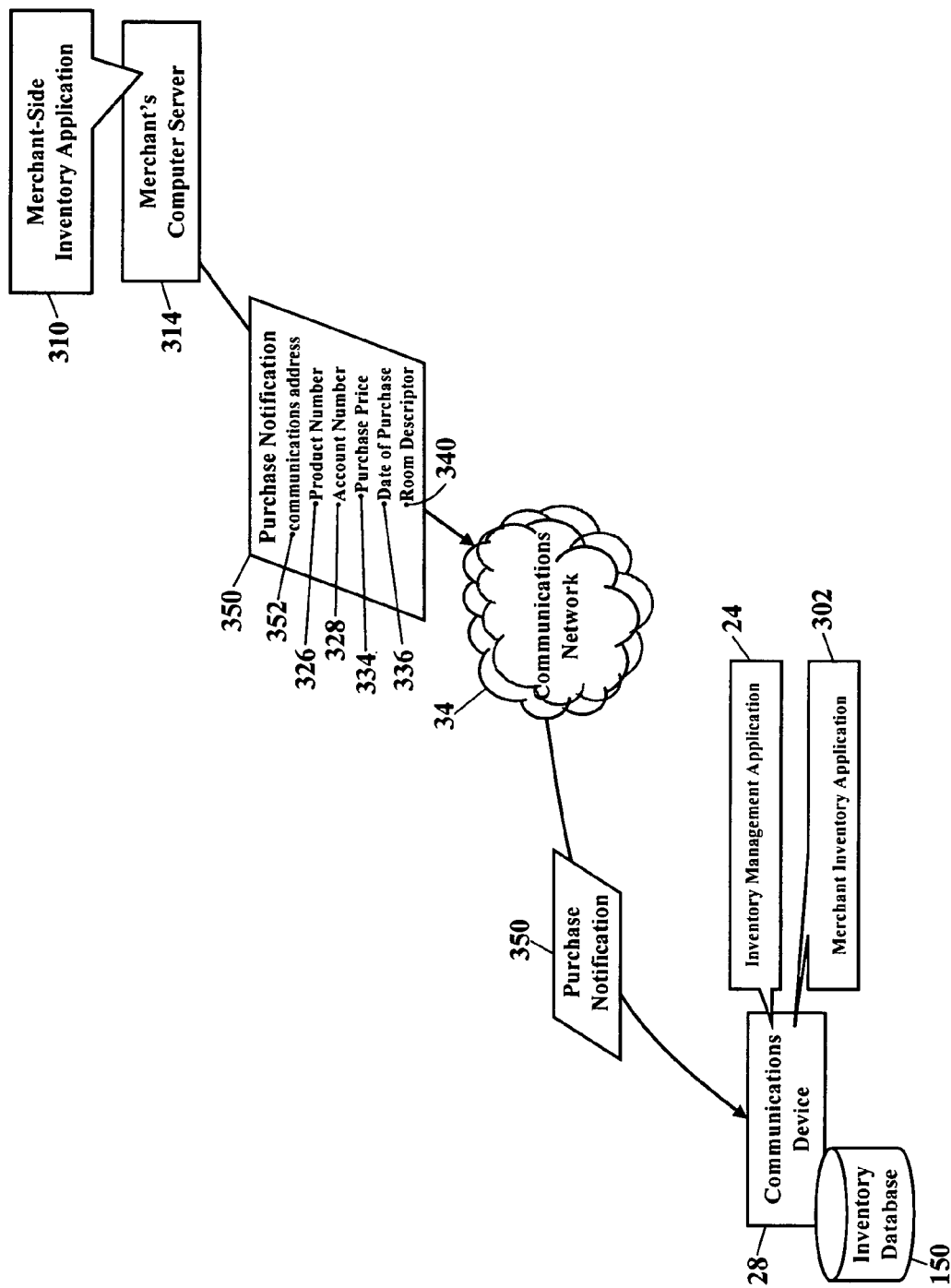

FIGS. 4-6 are schematics illustrating automatic inventory updates, according to yet more exemplary embodiments. Here the merchant inventory application 302 is notified of the user's purchases. When the user wishes to purchase a product or service, the merchant's computer server 314 may receive a purchase request 320. The purchase request 320 may originate from a point-of-sale terminal 322, from the user's communications device 28, or from the user's wireless mobile communications device 324 (such as a mobile phone or personal data assistant). Regardless from where the purchase request 320 originates, the purchase request 320 communicates via the communications network 34 to the merchant's computer server 314.

The purchase request 320 describes the purchase transaction. The purchase request 320, for example, may include information that describes a product number 326, an account number 328, and/or the purchaser's inventory information 330. The product number 326 may include any alphanumeric string or information that uniquely identifies the product or service being purchased. The product number 326, for example, may be bar code or other number that uniquely describes the product or service. The product number 326 may even be an industry-adopted number or other identifier that describes a particular manufacturer's product/service. The product number 326 may also be a standardized identifier that universally describes the product or service. The account number 328 identifies an account to be processed for payment, such as a credit card account number 332 or other account information for a financial institution. The purchase request 320 may also include information that describes a purchase price 334 and/or a date 336 of purchase.

The purchase request 320 may also include the inventory information 330. The inventory information 330 identifies the purchaser's inventory database 150 that is to be updated to reflect the purchase. The inventory information 330, for example, may include a communications address and/or destination addresses for the inventory database 150. If, for example, the merchant's computer server 314 is going to inform the purchasing user's communications device 28 of the purchase, then the merchant's computer server 314 may require an IP address of the communications device 28. The merchant's computer server 314 may additionally or alternatively send purchase notifications to the inventory database 150. However the purchasing user's inventory database 150 is managed, the inventory information 330 may include a communications address 338 of a communications device that manages the purchaser's inventory database 150. The inventory information 330 thus describes where purchase notifications are sent.

The purchase request 320 may also include a room descriptor 340. When the user makes a purchase, the user may associate that purchase to the room descriptor 340. The room descriptor 340 describes a room in a layout of a building. When the user purchases a product, that product is almost always destined for a room in an office, home, or other building. The room descriptor 340 thus describes a room in the building that will be associated with the product number 326. The room descriptor 340 thus permits the inventory database 150 to maintain an inventory of items on a room-by-room basis. When the user purchases hand soap, for example, the purchasing user may enter the room descriptor 340 that associates the hand soap with a lavatory. When the user purchases toner cartridges, the user may enter the room descriptor 340 that associates those toner cartridges with a copy room or storage room. Whatever the room descriptor 340, the user is able to associate the product number 326 to a room in a layout of a building.

FIG. 5 illustrates payment verification. When the merchant's computer server 314 receives the purchase request (shown as reference numeral 320 in FIG. 4), the merchant's computer server 314 may send a payment transaction 342 via the communications network 34. The merchant's computer server 314, for example, may communicate the account number 328 to a communications address associated with a financial institution's server 344. The account number 328 represents a debit or credit account which is processed for payment. The merchant's computer server 314 may then receive a response 346. When the response 346 indicates that the transaction was approved, the merchant-side inventory application 310 then has authority to update the purchasing user's inventory database 150. If, however, the transaction is declined, then the merchant-side inventory application 310 may halt or suspend the update. Because account processing and payment verification are well-known to those of ordinary skill in the art, no further explanation of FIG. 5 is given.

FIG. 6 illustrates an update of the inventory database 150. When payment is approved for the user's purchase, the merchant-side inventory application 310 may update the purchaser's inventory database 150. According to exemplary embodiments, the merchant-side inventory application 310 sends a purchase notification 350 to update the purchaser's inventory database 150 with the recently-purchased good or service. The purchase notification 350 is addressed to a communications address 352 of any device that manages the purchaser's inventory database 150. The communications address 352 is preferably obtained from the inventory information (shown as reference numeral 330 in FIG. 4). FIG. 6, for example, illustrates the purchase notification 350 communicating via the communications network 34 to the merchant inventory application 302 operating in the user's communications device 28. If the inventory database 150 is remotely located from the user's communications device 28, then the purchase notification 350 may additionally or alternatively communicate to an address associated with the inventory database 150.

The purchase notification 350 describes the purchase. The purchase notification 350, for example, may include information that describes the product number 326 and the account number 328. The product number 326 identifies the purchased product or service, and the account number 328 identifies to what account payment was processed. The purchase notification 350 may also include information that describes the purchase price 334 and/or the date 336 of purchase. The purchase notification 350 may also include the room descriptor 340 that identifies what room will be associated with the purchased product number 326 and/or the account number 328.

The purchasing user's inventory database 150 is updated to reflect the purchase. When the user's communications device 28 receives the purchase notification 350, the merchant inventory application 302 may instruct the processor (shown as reference numeral 30 in FIGS. 1-3) to process that purchase. The merchant inventory application 302 may thus extract the product number 326 and enter or posts the product number 326 into the inventory database 150. The merchant inventory application 302 may also extract the account number 328, the purchase price 334, the date 336 of purchase, and/or the room descriptor 340. The merchant inventory application 302 may thus create a database entry that completely describes the user's purchase. Here, again, the merchant not only sells a product or service to the purchasing user, but the merchant (via the merchant's computer server 314) may also provide an inventory service to the purchaser. The merchant's computer server 314 may automatically update the inventory database 150 to reflect the purchased product or service. The purchasing user is thus relieved from manually entering the purchase into the inventory database 150.

Figure 7:
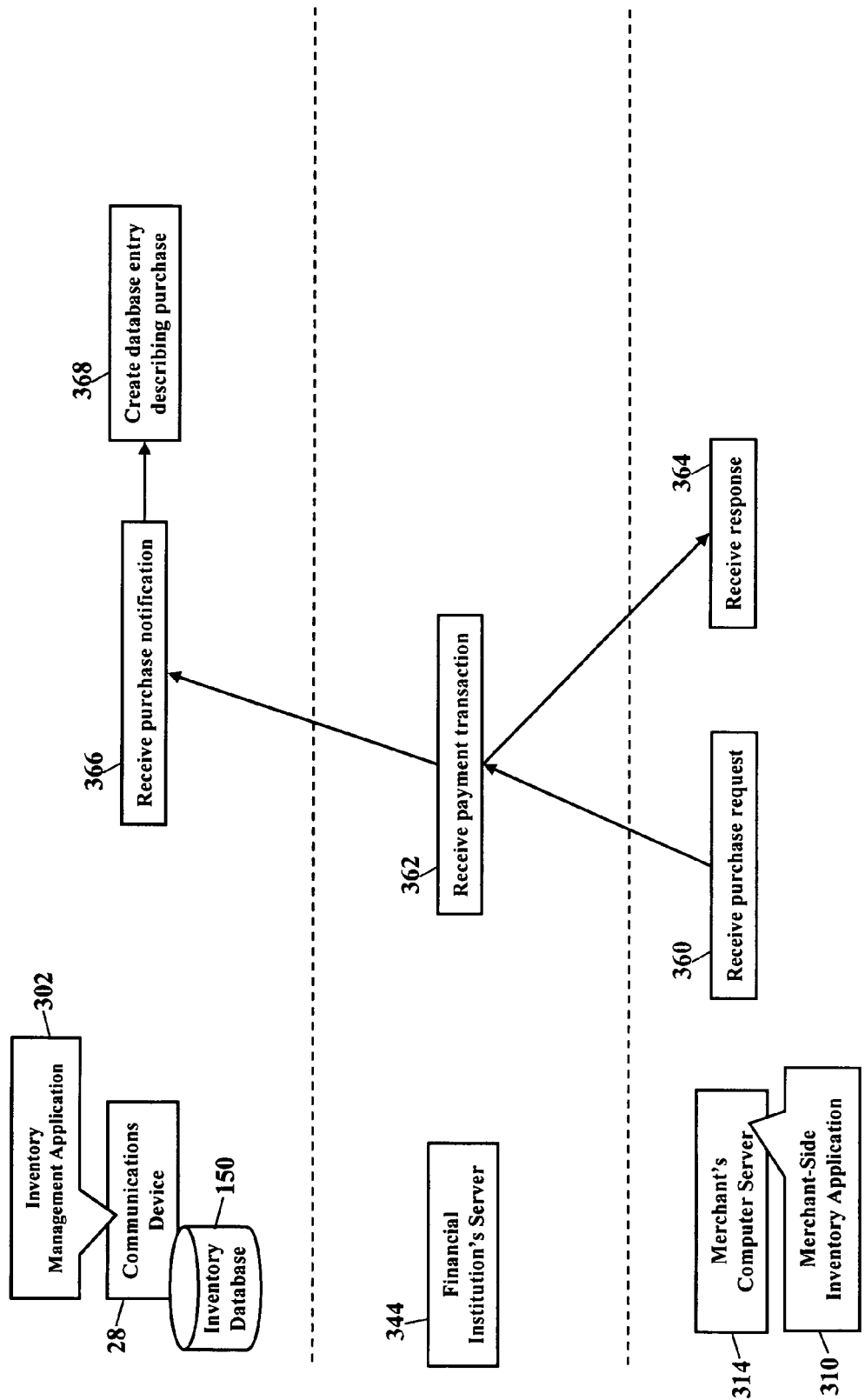
FIG. 7 is a schematic illustrating another process for automatic inventory updates, according to even more exemplary embodiments.

FIG. 7 is a schematic illustrating another process for automatic inventory updates, according to even more exemplary embodiments. Here the purchasing user's financial institution updates the user's inventory database 150. That is, whereas FIG. 6 illustrates the merchant's computer server (shown as reference numeral 314) sending the purchase notification 350, here the financial institution's server 344 sends the purchase notification 350 to update the user's inventory database 150. The merchant's computer server 314 receives the purchase request (Step 360), and the merchant's computer server 314 sends the payment transaction to the financial institution's server 344 (Step 362). The financial institution's server 344 may itself process the payment transaction, or the financial institution's server 344 may "hand off" or delegate the payment transaction to another computer. Regardless, the financial institution's server 344 sends the response to the merchant's computer server 314 (Step 364). The response indicates either that the transaction was approved or declined. Although not shown, the financial institution's server 344 may optionally authenticate the account holder (the purchasing user) by sending an authentication request to the merchant's computer server 314 and/or to the purchasing user's communications device 28. The authentication request may solicit or require the purchasing user's electronic signature, PIN, or other authorizing information. The authentication request may instruct the purchasing user's communications device 28 to capture a digital picture of the user. When, for example, the purchasing user's communications device 28 has access to a digital camera, the authentication request may require that a digital picture be currently captured and return communicated for authentication. When the transaction is approved, the financial institution's server 344 sends the purchase notification 350 to the merchant inventory application 302 operating in the user's communications device 28 (Step 366). The purchase notification 350 describes the purchase and may include the product number, the account number, the purchase price, the date of purchase, and/or the room descriptor (shown, respectively, as reference numerals 326, 328, 334, 336, and 340 in FIG. 6). The merchant inventory application 302 creates a database entry in the inventory database 150 that completely describes the user's purchase (Step 368). Here, then, the financial institution provides an inventory service to the purchaser by automatically updating the purchasing user's inventory database 150. The purchasing user is again relieved from manually entering the purchase into the inventory database 150.

Figure 8:
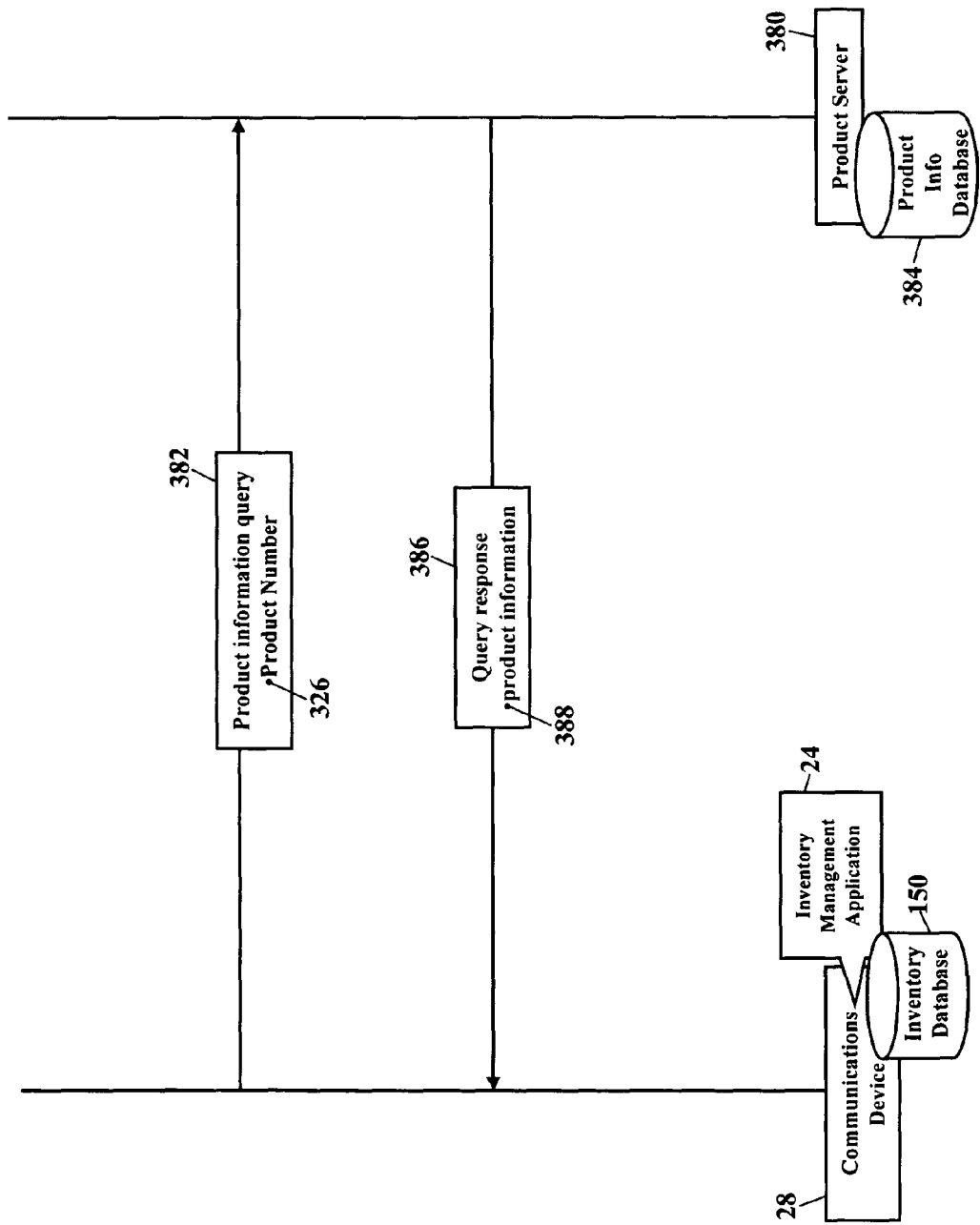
FIG. 8 is a schematic illustrating automatic acquisition of product information, according to exemplary embodiments.

FIG. 8 is a schematic illustrating automatic acquisition of product information, according to exemplary embodiments. Here the inventory management application 24 may automatically populate the inventory database 150 with product information. As FIGS. 6 and 7 illustrated, the purchasing user's inventory database 150 may be notified of each purchase. The merchant inventory application 302 creates a database entry in the inventory database 150 that describes each purchase. Each entry may include the product number, the account number, the purchase price, the date of purchase, and/or the room descriptor (shown, respectively, as reference numerals 326, 328, 334, 336, and 340 in FIG. 6). FIG. 8 illustrates that the inventory management application 24 may automatically acquire additional information that helps describe that purchase. FIG. 8, for example, illustrates a product information query that is sent to a product server 380 (Step 382). The product information query may include the product number 326. The product server 380 may be maintained by a retailer, a manufacturer, an information provider, or any other entity. Regardless, the product server 380 stores and maintains a product information database 384. The product information database 384 stores product information, specifications, operating manuals, repair manuals, schematics/drawings, and any other information which is associated to the product number 326. The product server 380 returns a query response (Step 386), and the query response includes product information 388. The product information 388 includes any information in the product information database 384 that is associated with the product number 326.

The product information database 384 may store any information. The product information database 384 may store information related to the history and/or the quality of a product. The product information database 384, for example, may store information that describes the manufacturer's name, the date of manufacture, and even manufacturing codes (such as plant codes and date codes). The product information database 384 may store information that describes a complete manufacturing history of the associated product number 326, including the receipt of raw materials and vendor names. The product information database 384 may describe the dates, times, and locations of molding/machining/fabricating operations for any components and/or the date, time, and location of final assembly. The product information database 384 may describe the date of shipment, the shipment method, and the shipper's name and route.

Exemplary embodiments may even be used for automated shopping. The inventory management application 24 (and/or any of the various inventory applications 300) may issue purchase requests, receive quotes or bids, evaluate those quotes/bids, and even select a vendor's quote or bid based on target considerations or rules. When the inventory management application 24, for example, notices an inventoried food or article is nearly depleted, the inventory management application 24 may consult a database of vendors. The inventory management application 24 obtains information from the vendor database that describes one or more approved vendors for the nearly depleted food or article. The inventory management application 24 may then communicate purchase requests to any of the approved vendors. The inventory management application 24 may then receive and evaluate vendor bids to fulfill the purchase request. Each vendor's bid may be evaluated based on a target price, delivery, quality, or any other specification. Once a vendor's bid is selected, the inventory management application 24 communicates with the vendor's server to coordinate purchase, payment, and delivery of the desired article.

The inventory management application 24 may conduct other automated shopping experiences. When the user decides to purchase an article, the inventory management application 24 may compare and shop for that desired article. The user first selects the article to be purchased, and the inventory management application 24 sends out purchase requests for the article. The user may enter a simple or complex text description of the desired article. The user, for example, may type "ball peen hammer" into a search field. The user may alternatively consult a directory of articles that provides a universal or common description for any product. The inventory management application 24 may then consult the database of vendors and send purchase requests to the vendors. The inventory management application 24 then receives and evaluates the bid responses from the vendors (a bid deadline may be adhered to). Each vendor's bid may be evaluated based on a target price, delivery, quality, or any other specification. Once a vendor's bid is selected, the inventory management application 24 communicates with the vendor's server to coordinate purchase, payment, and delivery of the desired article. Here, then, the user merely specifies the article to be purchased, and the inventory management application 24 shops for the article on behalf of the user.

The purchase request may include any information. The purchase request, for example, may describe a target price and/or a desired manufacturer and model number. The purchase request may include information that describes the product number 326, the purchaser's inventory information 330, and/or the date 336 of purchase. The purchase request may even describe some desired product/service traits, such as a location of manufacture or growth (e.g., country and place), what ingredient(s) or materials are desired in the article, and/or whether the article must be free from prison labor or children labor. When the inventory management application 24 receives the bid responses, the inventory management application 24 may evaluate each vendor's bid response according to the targets or desired traits. If the inventory management application 24 is unable to evaluate a bid, the inventory management application 24 may retrieve product specifications from the product database 384. Once a vendor's bid is selected, the inventory management application 24 communicates with the vendor's server to coordinate purchase, payment, and delivery of the desired article. Here, then, the user merely specifies the article to be purchased, and the inventory management application 24 shops for the article on behalf of the user.

Figure 9:
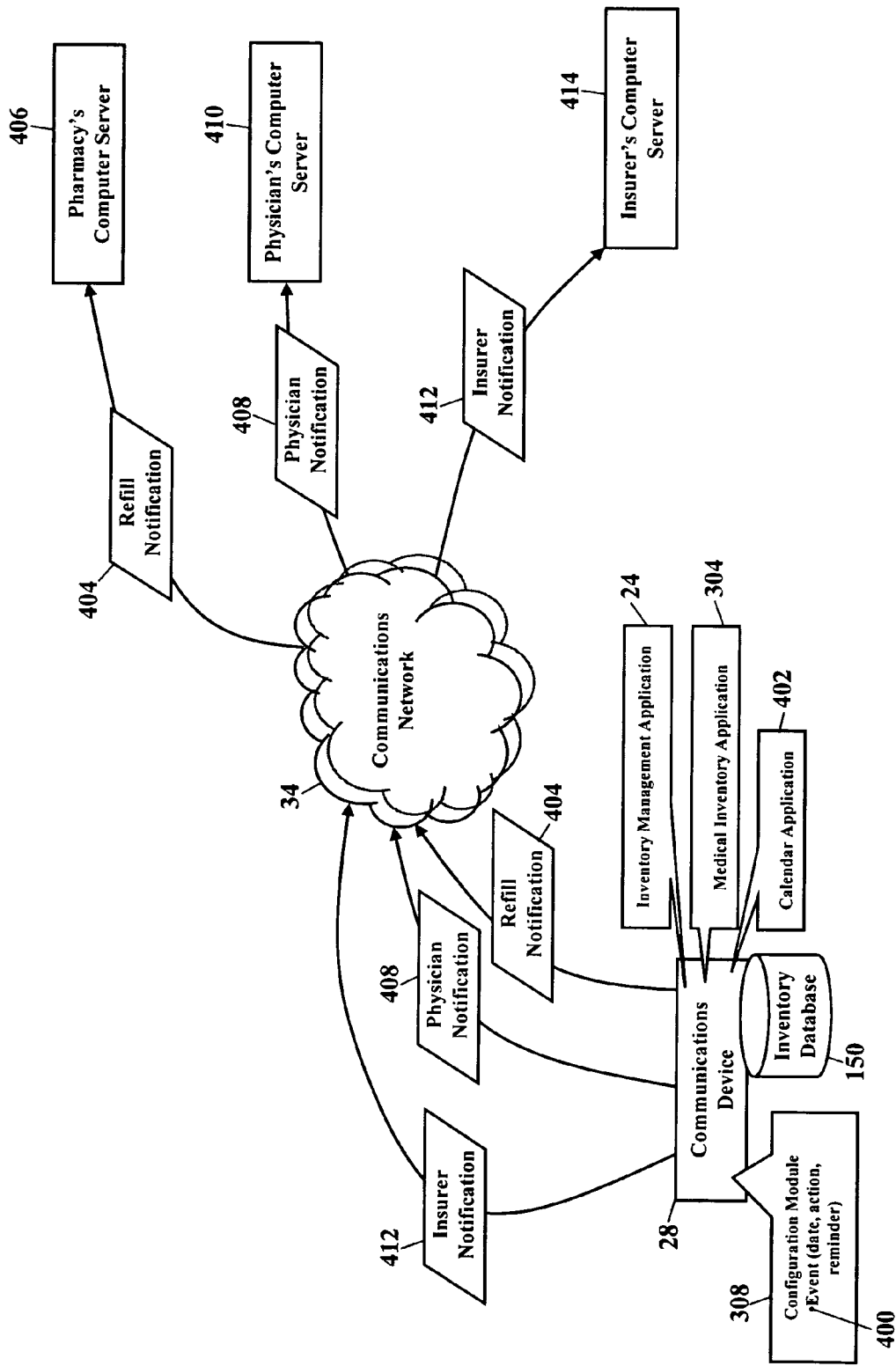
FIG. 9 is a schematic illustrating automatically obtained medication, according to even more exemplary embodiments.

FIG. 9 is a schematic illustrating automatically obtained medication, according to even more exemplary embodiments. Here the inventory management application 24 may determine when prescription and non-prescription medications need refilling. The inventory management application 24 interacts with the medical inventory application 304 to track the user's inventory of medical supplies. When the inventory database 150 indicates that prescription or non-prescription medicine is low or depleted, the medical inventory application 304 may interface with an insurer, pharmacy, or physician to obtain a refill. The medical inventory application 304 may determine a date when medication is depleted. The medical inventory application 304, for example, may receive input data representing the usage of medical supplies. The medical inventory application 304 may then determine on what future date that medication will be depleted. The user, for example, may use the configuration module 308 to set a calendar event 400 for a calendar application 402. The calendar event 400 may have an associated date, action(s), and reminder(s). In this medical example, the user establishes a refill event that specifies a date on which the medical inventory application 304 initiates a refill of the user's medication. The medical inventory application 304 may then be configured to send a refill notification 404 to a communications address associated with a pharmacy's computer server 406. The refill notification 404 may include any information the pharmacy may require in order to refill the medication (e.g., patient's name, insurer, and product number or prescription number $R_x$ that uniquely identifies medication and/or prescription). If a doctor's permission is required for the refill, the medical inventory application 304 may send a physician notification 408 to a communications address associated with the physician's computer server 410. The medical inventory application 304 may additionally or alternatively interface with a complementary pharmacy inventory application (not shown) and send the physician notification 408 to the physician's computer server 410. The physician notification 408 may include any information the physician may require in order to authorize the refill (e.g., patient's name, insurer, and medication/prescription number). If an insurer's permission or authorization is required for the refill, the medical inventory application 304 may send an insurer notification 412 to a communications address associated with the insurer's computer server 414. The insurer notification 412 may include any information the insurer may require in order to authorize the refill (e.g., patient's name, physician, and medication/prescription number). Exemplary embodiments may thus automatically initiate refills of prescription and non-prescription medical supplies.

An example may help further explain FIG. 9. Suppose the user takes a daily dosage of prescription cholesterol medication. If the user is given a 200-tablet supply, then medication will be depleted in 200 days (assuming the user diligently takes the medication according to the daily regimen). The configuration module 308 allows the user to set the refill event 400 in the user's calendar application 402. The refill event 400 is associated with a date and an action. Here, then, the user may set the refill event 400 for the $200^{th}$ day from the date of filling the prescription. (If the user is permitted to refill the prescription prior to depletion, the user may wish to establish a shorter date, such as the $180^{th}$ day, in order to have an inventory buffer.) The user may also specify what party or parties should be contacted to properly refill the prescription. If the insurer must provide authorization or benefit information, the user configures an action that sends the insurer notification 412 to a communications address associated with the insurer's computer server 414. If a doctor's permission is required, the user configures an action that sends the physician notification 408 to a communications address associated with the physician's computer server 410. The user may also configure an action that sends the refill notification 404 to a communications address associated with the pharmacy's computer server 406. The medical inventory application 304 may thus automatically initiate refills of the user's prescription cholesterol medication.

Exemplary embodiments may be applied to any calendaring application. The calendaring application 402 may be configured to include any or all of the features described herein. The calendaring application 402, for example, may be configured to permit, or to not permit, automatic notifications and remote access. Those of ordinary skill in the art will also appreciate that there are many suitable implementations for the calendaring application 402 described herein. MICROSOFT®, for example, offers OUTLOOK® and OUTLOOK EXPRESS®, both of which provide electronic calendars (MICROSOFT®, OUTLOOK®, and OUTLOOK EXPRESS® are registered trademarks of Microsoft Corporation, One Microsoft Way, Redmond Wash. 98052-6399, 425.882.8080, www.Microsoft.com). Other vendors also offer other calendaring software applications, and the concepts described herein may be applied to any calendaring application by any vendor.

Figure 10:
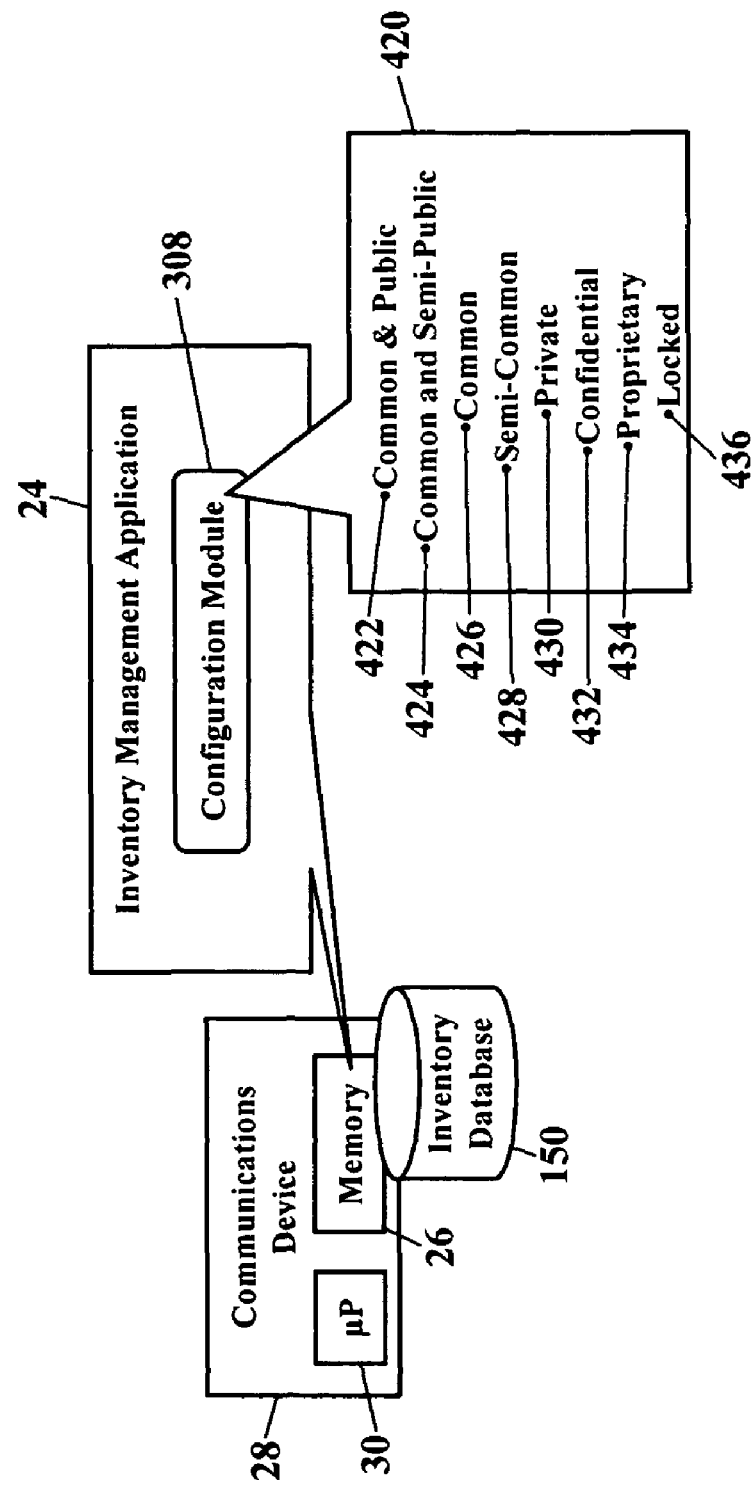
FIG. 10 is a schematic illustrating a configuration module for configuring an inventory service, according to still more exemplary embodiments.

FIG. 10 is a schematic further illustrating the configuration module 308, according to still more exemplary embodiments. The configuration module 308 allows the user to completely configure the inventory management application 24 and/or any entry in the inventory database 150. FIG. 10, for example, illustrates various categorical tags 420 or annotations that may added to each inventoried article in the inventory database 150. The configuration module 308 allows the user to further categorize or classify the inventoried items, thus allowing the user to organize the entries in the inventory database 150.

FIG. 10 illustrates the categorical tags 420. The user may associate an entry with a "Common and Public" tag 422 that allows any portion of a database entry to be shared with the outside world. That is, any entity (such as friends, merchants, and marketers) may query the inventory database 150 and obtain the database entries that are tagged as "Common and Public." A "Common and Semi-Public" tag 424 may be shared only with specific entities, and the user may be required to specifically list those entities. A "Common" tag 426 describes a good or service which is, in any way, common to a group of people (such as household members). A "Semi-common" tag 428 describes a good or service which may be only shared with a named member of the user's household and with the outside world. A "Private" tag 430 describes those goods or services that may only be accessed by a member of the user's household. The user, for example, may tag medical records as only being accessible to household members. A "Confidential" tag 432 is used for database entries that may only be accessed by named individuals. A "Proprietary" tag 434 is reserved for database records that are proprietary, and a "Locked" tag 436 prohibits access to the entry except by an owner of the inventoried item. Each categorical tag 420 may even include its own security mechanism to inhibit or even prevent usage.

Figure 11:
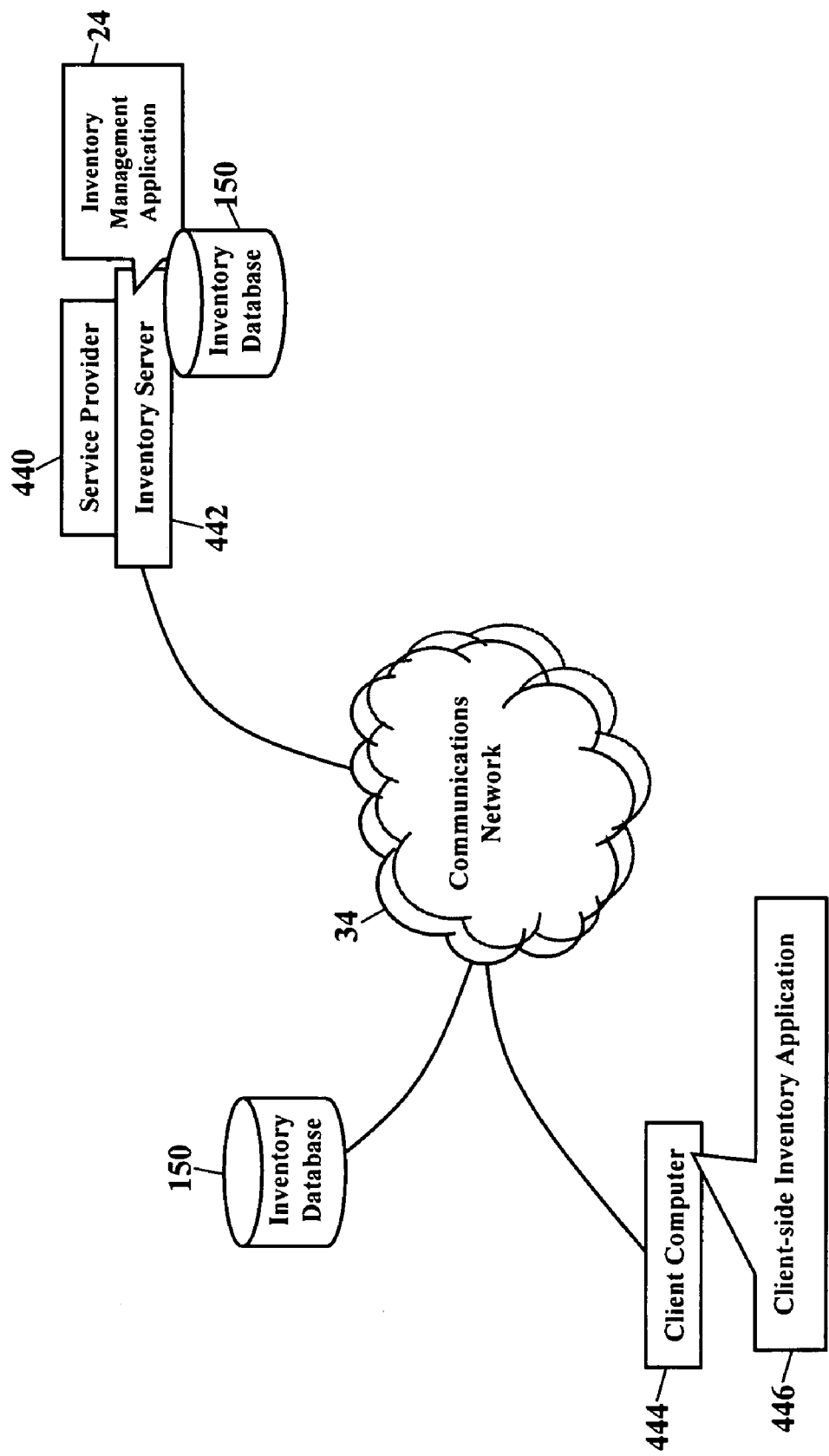
FIG. 11 is a schematic illustrating an alternative network environment in which exemplary embodiments may be implemented.

FIG. 11 is a schematic illustrating an alternative network environment in which exemplary embodiments may be implemented. Here a service provider 440 offers an inventory service to customer-clients. An inventory server 442 is operated by, or on behalf of, the service provider 440, and the inventory server 442 stores and executes the inventory management application 24. The inventory server 442 may also locally or remotely access the inventory database 150 via the communications network 34. The service provider's inventory server 442 also communicates via the communications network 34 with a customer's client computer 444. The inventory server 442 and the customer's client computer 444 thus have a server-client relationship. Here, then, the service provider 440 offers an inventory service to the customer, wherein the service provider maintains an inventory of the customer's property and possessions. Anything the customer purchases, owns, and/or possesses is logged and tracked by the inventory management application 24 operating in service provider's inventory server 442. Because the service provider 440 offers this inventory service to the customer, the service provider 440 relieves the customer of the burden of maintaining the inventory database 150. When the customer makes purchases, the purchase notification (shown as reference numeral 350 in FIGS. 6 & 7) is sent to a communications address associated with the inventory server 442. The customer's client computer 444 may store and execute a client-side inventory application 446 that allows the customer to configure the inventory service. Otherwise, however, the customer may delegate management and maintenance of the inventory service to the service provider's personnel. The service provider 440 may bill for the inventory service, for example, on a monthly basis or on a per-transaction or per-purchase basis. The service provider 440 may even permit the customer to sell or lease unused memory in the inventory database 150. If the customer fails to utilize all the allocated memory, the customer may offer that unused memory to others.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

What is claimed is:

1. A method of managing inventory, comprising:
receiving, at a financial institution's computer, a purchase request to purchase a toner printer cartridge, the purchase request comprising a product number, an account number, a purchaser's inventory information, and a room descriptor, the product number uniquely identifying the toner printer cartridge to be purchased, the account number identifying an account to be processed for payment, the inventory information identifying a purchaser's inventory database to update with the product number, and the room descriptor associating the toner printer cartridge to a copy room;
process a financial transaction at the financial institution's computer that authorizes payment of the purchase request; and
when payment is authorized, sending the product number from the financial institution's computer to the purchaser's inventory database according to the purchaser's inventory information,
wherein the financial institution's computer updates the purchaser's inventory database to reflect the purchase of the toner printer cartridge.

2. The method according to claim 1, wherein receiving the purchase request comprises receiving a credit card account number as payment.

3. The method according to claim 1, wherein receiving the purchase request comprises receiving a communications address of a communications device that manages the purchaser's inventory database.

4. The method according to claim 1, further comprising communicating the room descriptor to the purchaser's inventory database to update the purchaser's inventory.

5. The method according to claim 1, wherein receiving the purchase request comprises receiving a room descriptor associated with a layout of a building, the room descriptor describing a room in the building that will be associated with the product number.

6. The method according to claim 5, further comprising:
receiving communications information describing communications requirements of the product to be inventoried;
accessing communications outlet information describing a communications outlet installed within one of the rooms of the building; and
associating the inventory information and the communications information to the communications outlet information.

7. The method according to claim 1, further comprising:
sending a product information query to a product server maintained by a manufacturer of the toner printer cartridge;
retrieving product information describing the toner printer cartridge; and
storing the product information in the purchaser's inventory database.

8. A system of managing inventory, comprising:
a processor executing code stored in memory that causes the processor to:
receive a purchase request to purchase a toner printer cartridge, the purchase request comprising a product number, an account number, a purchaser's inventory information, and a room descriptor, the product number uniquely identifying the product to be purchased, the account number identifying an account to be processed for payment, the inventory information identifying a purchaser's inventory database to update with the product number, and the room descriptor associating the toner printer cartridge to a copy room;
process a financial transaction that authorizes payment of the purchase request;
associate the toner printer cartridge in an inventory database to the purchaser's inventory information;
associate the copy room to multiple users;
establish access permissions for each user to the purchaser's inventory information; and
when payment is authorized, send the product number to the purchaser's inventory database to update the purchaser's inventory information,
wherein the purchaser's inventory database is updated to reflect the purchase of the toner printer cartridge.

9. The system according to claim 8, further comprising code that causes the processor to receive a credit card account number as payment.

10. The system according to claim 8, further comprising code that causes the processor to receive a communications address of a communications device that manages the purchaser's inventory database.

11. The system according to claim 8, further comprising code that causes the processor to associate the copy room to a layout of a building.

12. The system according to claim 11, further comprising code that causes the processor to communicate the room descriptor to the purchaser's inventory database to update the purchaser's inventory.

13. The system according to claim 8, further comprising code that causes the processor to communicate a purchase price and a date of purchase to the purchaser's inventory database.

14. A computer program product comprising computer-readable instructions for:
receiving, at a financial institution's computer, a purchase request to purchase a toner printer cartridge, the purchase request comprising a product number, an account number, a purchaser's inventory information, and a room descriptor, the product number uniquely identifying the product to be purchased, the account number identifying an account to be processed for payment, the inventory information identifying a purchaser's inventory database to update with the product number, and the room descriptor associating the toner printer cartridge to a copy room;

authorizing payment of the purchase request;

when payment is authorized, sending the product number from the financial institution's computer to the purchaser's inventory database to update the purchaser's inventory information;

storing the product number in the inventory database;

associating the product number with an access permission;

configuring the access permission as public or private, the public permission permitting other users to view the product number when accessing the inventory information, and the private permission hiding the product number when the other users access the inventory information, wherein the financial institution's computer updates the purchaser's inventory database to reflect the purchase of the toner printer cartridge.

15. The computer program product according to claim 14, further comprising instructions for receiving a credit card account number as payment.

16. The computer program product according to claim 14, further comprising instructions for receiving a communications address of a communications device that manages the purchaser's inventory database.

17. The computer program product according to claim 14, further comprising instructions for associating the copy room to a layout of a building.

18. The computer program product according to claim 14, further comprising instructions for communicating the room descriptor to the purchaser's inventory database to update the purchaser's inventory information.

* * * * *